United States Patent
Schnizler

(10) Patent No.: US 11,687,320 B2
(45) Date of Patent: Jun. 27, 2023

(54) SLIP DETECTION ON MULTI-LANE SERIAL DATALINKS

(71) Applicant: VIAVI SOLUTIONS INC., San Jose, CA (US)

(72) Inventor: Reiner Schnizler, Eningen Unter Achalm (DE)

(73) Assignee: VIAVI SOLUTIONS INC., Chandler, AZ (US)

( * ) Notice: Subject to any disclaimer, the term of this patent is extended or adjusted under 35 U.S.C. 154(b) by 17 days.

(21) Appl. No.: 17/161,294

(22) Filed: Jan. 28, 2021

(65) Prior Publication Data

US 2021/0149631 A1    May 20, 2021

Related U.S. Application Data

(63) Continuation of application No. 16/356,881, filed on Mar. 18, 2019, now Pat. No. 10,956,124.

(51) Int. Cl.
| | |
|---|---|
| *G06F 13/42* | (2006.01) |
| *G06F 5/06* | (2006.01) |
| *G06F 5/16* | (2006.01) |
| *H04L 25/14* | (2006.01) |
| *H04L 47/56* | (2022.01) |

(52) U.S. Cl.
CPC ............... *G06F 5/065* (2013.01); *G06F 5/16* (2013.01); *G06F 13/4291* (2013.01); *H04L 25/14* (2013.01); *H04L 47/56* (2013.01)

(58) Field of Classification Search
CPC ........ G01R 31/31725; G01R 31/31726; G06F 5/06; G06F 5/065; G06F 5/10; G06F 5/12; G06F 5/14; G06F 5/16; H04L 7/0016; H04L 7/0034; H04L 7/0054; H04L 25/14; H04L 47/56
USPC ............... 327/3, 231–236; 370/226; 375/516; 710/52–57; 713/503; 714/700
See application file for complete search history.

(56) References Cited

U.S. PATENT DOCUMENTS

| | | | | |
|---|---|---|---|---|
| 7,454,537 B1 * | 11/2008 | Xue | ......................... | H04L 25/14 713/400 |
| 2007/0177701 A1 * | 8/2007 | Thanigasalam | ........... | H04L 7/02 375/372 |
| 2008/0126888 A1 | 5/2008 | Haas et al. | | |
| 2008/0130814 A1 | 6/2008 | Li et al. | | |
| 2014/0269769 A1 | 9/2014 | Gresham et al. | | |
| 2015/0012774 A1 * | 1/2015 | Maeda | ................. | G06F 11/0745 714/5.1 |
| 2016/0202722 A1 | 7/2016 | Kuwata | | |

* cited by examiner

*Primary Examiner* — Ilwoo Park
(74) *Attorney, Agent, or Firm* — Mannava & Kang, P.C.

(57) ABSTRACT

The disclosure relates to detecting phase slips that may occur in a multi-lane serial datalink. Phase slips may occur when a lane experiences lane skew, which may introduce a phase slip with respect to another lane. To detect phase slippage, the system may select a reference lane from among the lanes. The system may generate a pre-deskew delta value based on a difference between the FIFO filling level of the reference lane before a deskew and the FIFO filling level of a second lane before the deskew. The system may generate a post-deskew delta value based on a difference between the FIFO filling level of the reference lane after the deskew and the FIFO filling level of the second lane after the deskew. The system may use a difference between the post-deskew delta and the pre-deskew delta to detect phase slip on the second lane relative to the reference lane.

17 Claims, 7 Drawing Sheets

SLIP DETECTION ON MULTI-LANE SERIAL DATALINKS

BACKGROUND

Phase slips are an increasing problem with high speed serial data links. The higher the bitrates, the more prone the links are to suffer from phase slip problems. Slips may be caused by the clock and data recovery units (CDRs) having to work with lower and lower signal-to-amplitude and signal-to-phase noise margins.

Currently, reliably detecting and analyzing phase slips occurring on high speed multi-lane data links is difficult because even though a data error resulting from phase slips are detectable, there may be several possible causes of the data errors. As such, testing and diagnosis tools may mischaracterize the true cause of the data error. For example, slips are oftentimes mischaracterized as error bursts. This can be misleading since the root causes for error bursts are very different from the root causes for phase slips in many cases. The problem is often exacerbated by the errors occurring infrequently (such as only once a day) and because slips may be dependent on the specific data pattern being processed. Therefore, diagnosing and fixing slip induced errors is often difficult and time consuming.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
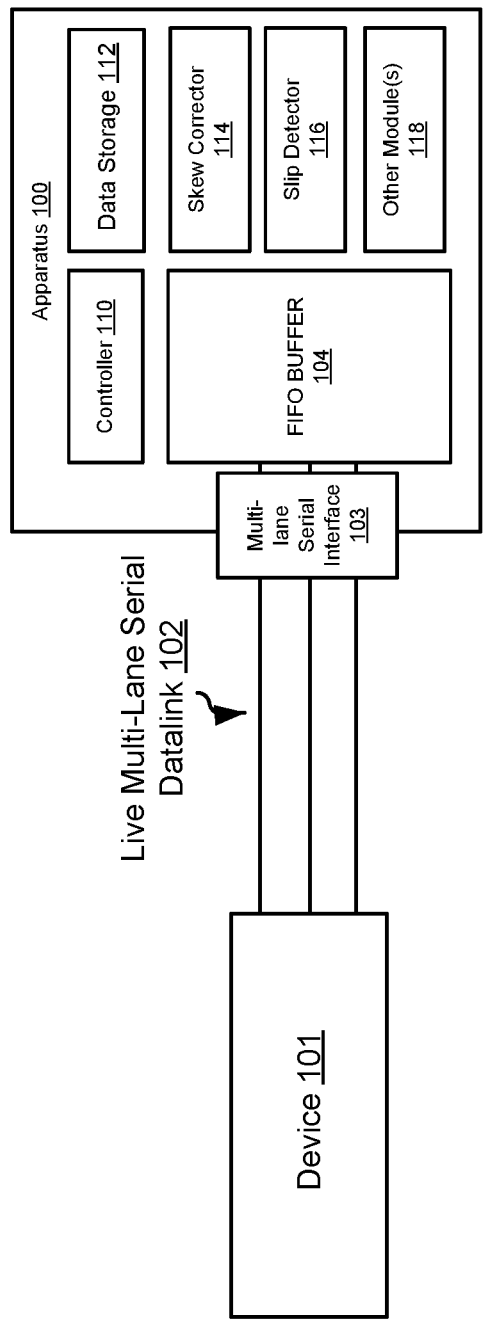
FIG. 1 illustrates an apparatus for detecting relative lane skew of a multi-lane serial datalink, according to an example of the disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

The disclosure relates to detecting phase slips that may occur relative to other lanes of a multi-lane serial datalink. A phase slip as used herein may include a forward slip in which bits are gained in a lane relative to another lane or a reverse slip in which bits are lost in a lane relative to another lane. This may result in alignment problems at a receiving end of a multi-lane serial datalink. Phase slips may occur when an individual lane experiences lane skew, thereby potentially introducing a phase slip with respect to another lane. An individual lane may experience lane skew when bits on the lane are received faster or slower than another lane even though the bits were transmitted at the same time. For example, the skew may be defined as a difference in arrival time of bit streams on each lane.

To detect phase slippage, a level of lane skew may be determined based on First-in-First-Out (FIFO) filling levels (FFLs) of each lane, both before and after a deskew event. A FIFO FFL for a lane pertains the number of bits the lane is skewed relative to another lane. Faster arrival of bits on a first lane compared to a second lane may result in a higher FFL compared to the FFL of the second lane. Conversely, slower arrival of bits on a first lane compared to a second lane may result in a lower FFL compared to the FFL of the second lane. As used herein, a deskew event (or simply "deskew") will refer to a deskew correction on a lane in which data may be re-aligned to correct for skew on the lane. These deskew events may be latched at regular intervals and/or be initiated on-demand in response to detected lane skew. The FFL before and after the skew event for a lane may indicate a level of skew that was corrected on the lane.

For each lane in the datalink, a test instrument may determine a pre-deskew delta (or difference, Δ) between a pre-deskew FFL for the lane and a pre-deskew FFL of a second lane. Likewise, the test instrument may determine a post-deskew delta between a post-deskew FFL for the lane and a post-deskew FFL of the second lane. A match between the post-deskew delta and the pre-deskew delta may indicate that the two lanes have not slipped relative to one another. These lanes may be considered partner lanes. This process may be repeated to identify all partner lanes of each lane. Once all partner lanes of each lane are identified, the test instrument may select a lane having the highest number partner lanes as a reference lane.

Once the reference lane is selected, the before and after deskew FFLs of the reference lane may be compared to the before and after deskew FFLs of each of the other lanes. For example, the test instrument may generate a pre-deskew delta based on the pre-deskew FFL of the reference lane and the pre-deskew FFL of another lane. Likewise, the test instrument may generate a post-deskew delta based on the post-deskew FFL of the reference lane and the post-deskew FFL of a test lane.

If a difference between the post-deskew delta and the pre-deskew delta (post-deskew delta minus the pre-deskew delta) is zero, then the test instrument may determine that no phase slippage on the test lane is detected. If the difference between the post-deskew delta and the pre-deskew delta (post-deskew delta minus the pre-deskew delta) is greater than zero (positive), then the test instrument may determine that a forward phase slip has occurred on the test lane (in other words, the lane has gained one or more bits relative to the reference lane). If the difference between the post-deskew delta and the pre-deskew delta (post-deskew delta minus the pre-deskew delta) is less than zero (negative), then the test instrument may determine that a reverse phase slip may be determined to have occurred on the test lane (in other words, the lane has lost one or more bits relative to the reference lane). The test instrument may repeat this process for each of the lanes to determine whether phase slippage has occurred on the lane relative to the reference lane.

FIG. 1 illustrates an apparatus 100 for detecting relative lane skew of a multi-lane serial datalink 102, according to an example of the disclosure. The multi-lane serial datalink 102 may include an Ethernet 40G, Ethernet 100G, Ethernet 200G, Ethernet 400G and/or other types of datalinks that include multiple lanes from a device 101. In some examples, any datalink having more than two lanes may be analyzed by the apparatus 100. The apparatus 100 may be configured as, for example, a test instrument. In some examples, the apparatus 100 may be removably attached to a network device (not illustrated) to detect lane skew in a multi-lane serial datalink 102 (also referred to herein as "datalink 102" for convenience). However, the apparatus 100 (and/or components of the apparatus) may be integrated into networking devices or other types of devices as well. In some examples, the apparatus 100 may be a standalone device.

The apparatus 100 may include various layers, processors, systems or subsystems. For example, the apparatus 100 may include a multi-lane serial interface 103, FIFO buffer 104, a controller 110, a data storage 112, and/or other components.

The multi-lane serial interface 103 may couple to the multi-lane serial datalink 102. The multi-lane serial interface 103 may include a data port, such as an Ethernet port, that may couple to the multi-lane serial datalink 102. Data from the multi-lane serial datalink 102 may be received at the multi-lane serial interface 103. In some examples, the data may be routed to a FIFO buffer 104. The FIFO buffer 104 may include a data storage that stores bytes of a multi-lane serial datalink 102 in a FIFO manner. The apparatus 100 may transmit (Tx) or receive (Rx) the multi-lane serial datalink 102 and may store the data (e.g., bytes) in the FIFO buffer 104 as data is received or transmitted. In an Rx operation of the apparatus 100, the FIFO buffer 104 may store incoming bytes of the datalink 102. In a Tx operation of the apparatus 100, the FIFO buffer 104 or another component of the apparatus 100 may measure outgoing bytes of the datalink. In some examples, a FIFO buffer 104 may be implemented for Tx operations and a separate FIFO buffer 104 may be implemented for Rx operations. The size of the FIFO buffer 104 may be adjusted according to particular needs, such as to balance between delay and the potential for bit loss. For example, the FIFO buffer 104 may be set low enough to minimize delay but large enough to tolerate an acceptable level of skew between lanes. Those having skill in the art will be able to adjust these levels according to particular needs.

The controller 110 may be a semiconductor-based microprocessor, a central processing unit (CPU), an application processor specific integrated circuit (ASIC), a field-programmable gate array (FPGA), and/or other suitable hardware device. Although the apparatus 100 has been depicted as including a single controller 110, it should be understood that the apparatus 100 may include multiple processors, multiple cores, or the like, without departing from the scopes of the apparatus 100 disclosed herein.

The data storage 112 may have stored thereon machine-readable instructions (which may also be termed computer readable instructions). In some examples of the controller 110, the data storage 112 may store machine-executable instructions that the controller 110 may execute. In other examples of the controller 110, the controller 110 may store the logical instructions or otherwise be configured to perform the functions described herein. The data storage 112 may be an electronic, magnetic, optical, or other physical storage device that includes or stores executable instructions. The data storage 112 may be, for example, Random Access memory (RAM), an Electrically Erasable Programmable Read-Only Memory (EEPROM), a storage device, an optical disc, and the like. The data storage 112 may be a non-transitory machine-readable storage medium, where the term "non-transitory" does not encompass transitory propagating signals.

The apparatus 100 may include a skew corrector 114, a slip detector 116, and/or other modules 118. It should be noted that the skew corrector 114 and the slip detector 116 may each include hardware and/or software modules used by the apparatus 100. For instance, the skew corrector 114 and/or the slip detector 116 may each include a hardware controller, similar to the controller 110. Alternatively, when embodied as instructions, the skew corrector 114 and/or the slip detector 116 may each be stored on data storage 112 for execution by the controller 110. It should be further noted that the skew corrector 114 may be separately included in another device, such as a device under test by the apparatus 100.

Figure 2:
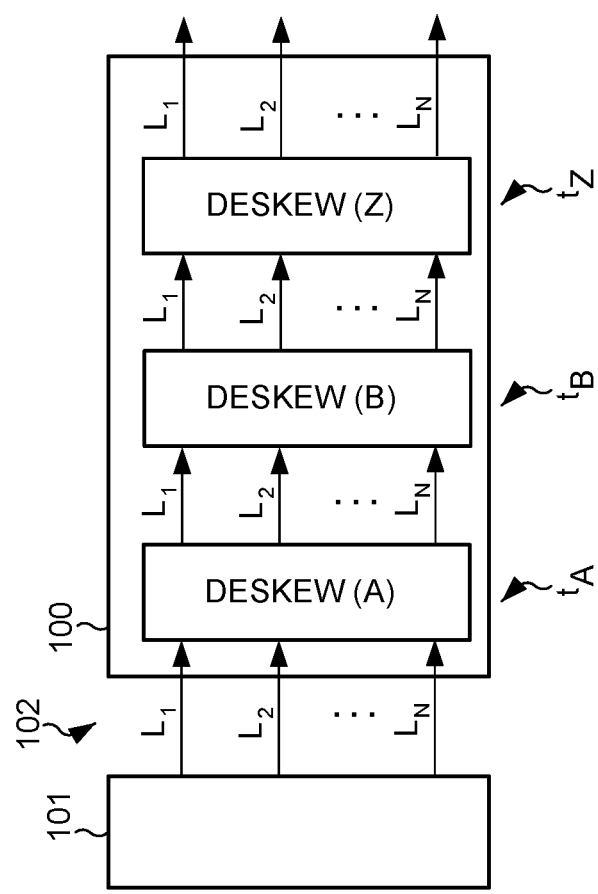
FIG. 2 illustrates latched deskew of a multi-lane serial datalink, according to an example of the disclosure.

The skew corrector 114 may deskew lanes of the datalink 102. Referring to FIG. 2, the skew corrector 114 may deskew (correct lane skew of) each lane L (illustrated as a lane $L_{1-N}$) of the datalink 102. The deskews may be latched at intervals. For example, the skew corrector 114 may perform a deskew (A) at time $T_A$, a deskew (B) at time $T_B$, and/or other deskew (Z) at time $T_Z$. In some instances, a deskew (A-Z) may be triggered by detection of lane skew in a lane L.

The skew corrector 114 may correct lane skew in various ways. For example, in some examples, one or more alignment markers may be provided on a periodic basis (at regular time intervals and/or bit intervals) on each lane. These alignment markers may enable alignment of the data in the lanes to be deskewed based on the fixed timing/bit intervals.

Figure 3:
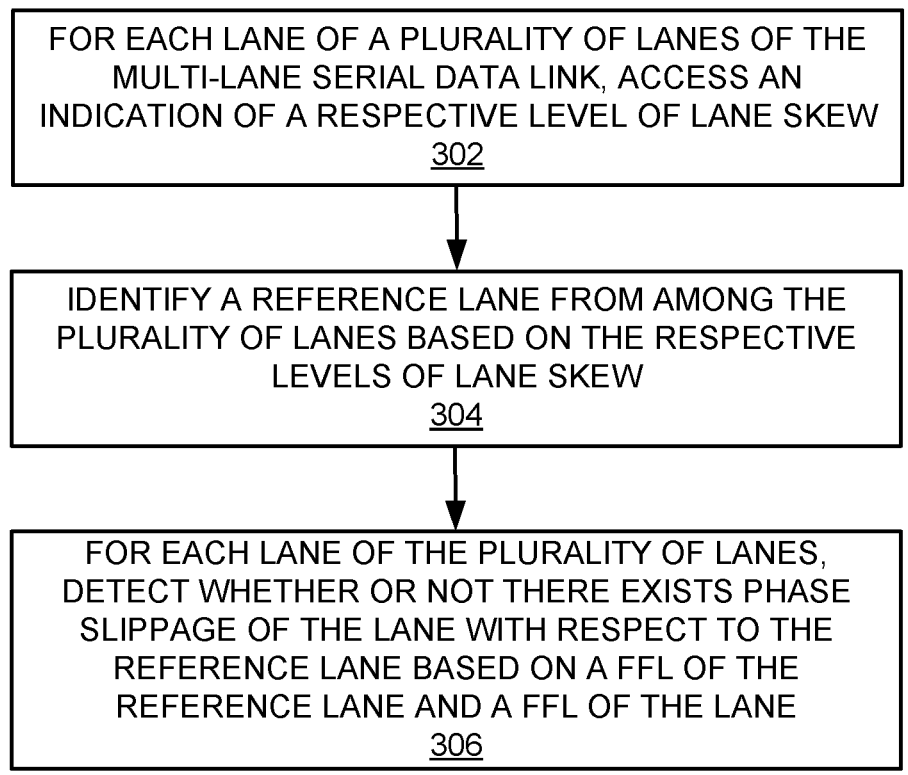
FIG. 3 illustrates an example method of detecting relative lane skew of a multi-lane serial datalink based on FIFO filling levels before and after a deskew, according to an example of the disclosure.
Figure 4:
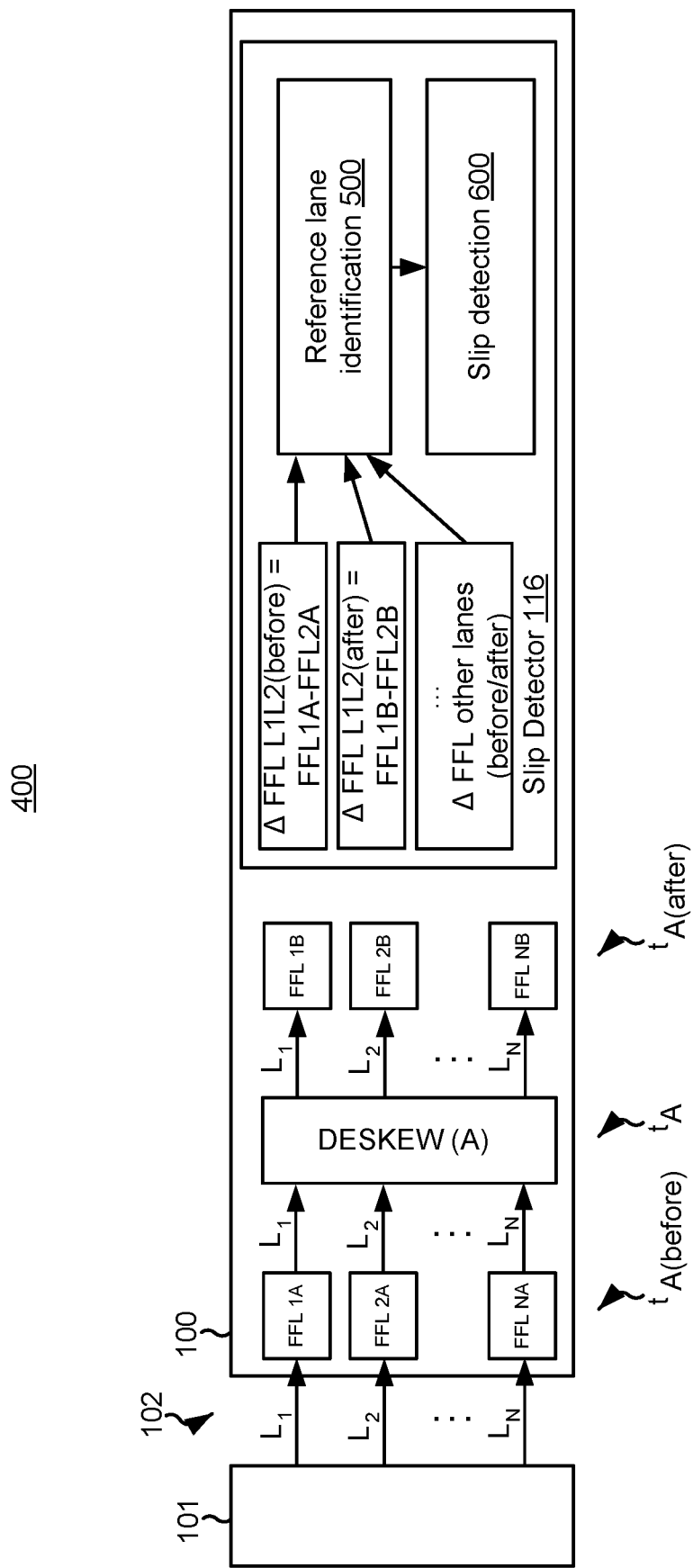
FIG. 4 illustrates a schematic diagram of detecting relative lane skew of a multi-lane serial datalink based on FIFO filling levels before and after a latched deskew, according to an example of the disclosure.

A level of lane skew that was corrected in a given lane $L_{1-N}$ may be reflected in FFLs before and after a deskew event. The slip detector 116 may analyze the FFLs of each lane, before and after the deskew event, to detect phase slippage on one or more of the lanes. Reference will now be made to FIG. 3 for a description of detecting phase slippage based on one or more deskew events. The discussion of FIG. 3 that follows also refers to FIGS. 4-6.

FIG. 3 illustrates an example method 300 of detecting relative lane skew of a multi-lane serial datalink based on FIFO filling levels before and after a deskew, according to an example of the disclosure. Although the method 300 is primarily described as being performed by apparatus 100 as shown in FIG. 1, the method 300 may be executed or otherwise performed by other systems, or a combination of systems. Each block shown in FIG. 3 may further represent one or more processes, methods, or subroutines, and one or more of the blocks may include machine-readable instructions stored on a non-transitory computer readable medium and executed by a processor or other type of processing circuit to perform one or more operations described herein.

At 302, the apparatus 100 may, for each lane of a plurality of lanes of the multi-lane serial datalink, access a FFL of the lane. As bits or symbols are received in a given lane, a corresponding FIFO buffer 104 (or portion allocated for the lane) may be filled. The level of filling (or FFL) may therefore indicate the skew of a lane. For example, referring to FIG. 4, the apparatus 100 may, for each lane $L_{1-N}$, determine a state of the FIFO buffer 104 with respect to that lane before and after a deskew. As illustrated, the slip detector 116 may determine a FFL 1A and FFL 1B for lane $L_1$ at times $t_{A(before)}$ and $t_{A(after)}$, respectively. FFL 1A may include the last latched FFL before deskew(A) and FFL 1B may include the first latched FFL after the deskew(A). FFLs before and after deskew may be similarly determined for each lane. For example, the slip detector 116 may determine a FFL 2A and FFL 2B for lane $L_2$ at times $t_{A(before)}$ and $t_{A(after)}$, respectively. The slip detector 116 may obtain before and after FFLs for other lanes LN of the datalink 102 in a similar manner.

At 304, the apparatus 100 may identify a reference lane from among the plurality of lanes based on the FFLs determined at 302. For instance, the lane having the highest number of partner lanes may be selected to be the reference lane. A lane is a partner lane to another lane when there is no relative skew between the two lanes. For example, a difference between the FFL of lane 1 before the deskew(A) and the FFL of lane 2 before the deskew(A) (Δ FFL L1L2(before)) may be determined by subtracting FFL 2A from FFL 1A (FFL1A−FFL2A). A difference between the FFL of lane 1 after the deskew(A) and the FFL of lane 2 after the deskew(A) (Δ FFL L1L2(after)) may be determined by subtracting FFL 2B from FFL 1B (FFL1B−FFL2B). If the Δ FFL L1L2(before) matches the Δ FFL L1L2(after), then lanes 1 and 2 may be considered partner lanes. The apparatus 100 may identify the reference lane based on the number of partner lanes of each lane. Other ways to perform the foregoing arithmetically may be used as well, so long as the before and after deskew FFLs of each of the two lanes are compared. An example of reference lane identification, which may be used at 304, will be described with respect to FIG. 5 below.

At 306, once the reference lane is identified, the apparatus 100 may, for each lane of the plurality of lanes, detect whether or not there exists phase slippage of the lane with respect to the reference lane based on a FFL of the reference lane and a FFL of the lane. An example of slip detection, which may be used at 306, will be described with respect to FIG. 6.

Figure 5:
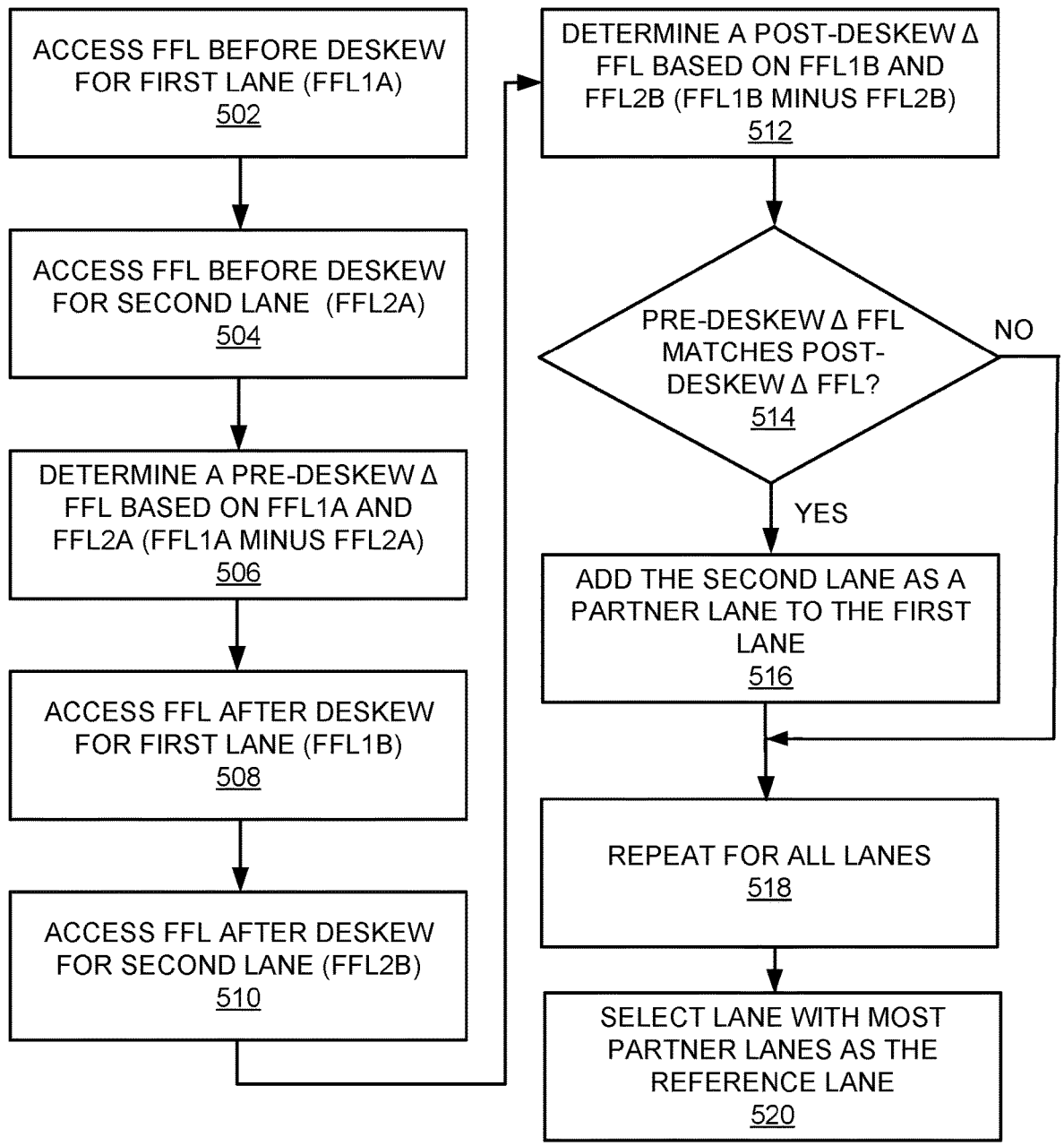
FIG. 5 illustrates an example method of identifying a reference lane for detecting relative lane skew of a multi-lane serial datalink based on FIFO filling levels, according to an example of the disclosure.

Reference will now be made with respect to FIG. 5, which illustrates an example method 500 of identifying a reference lane for detecting relative lane skew of a multi-lane serial datalink based on FIFO filling levels, according to an example of the disclosure. Although the method 500 is primarily described as being performed by apparatus 100 as shown in FIG. 1, the method 500 may be executed or otherwise performed by other systems, or a combination of systems. Each block shown in FIG. 5 may further represent one or more processes, methods, or subroutines, and one or more of the blocks may include machine-readable instructions stored on a non-transitory computer readable medium and executed by a processor or other type of processing circuit to perform one or more operations described herein. Various examples described in FIG. 5 will refer back to FIG. 4.

At 502, the apparatus 100 may access an FFL before deskew for a first lane. It should be noted that the term "first lane" does not necessarily imply a sequence number of the lanes. For example, the apparatus 100 may access FFL 1A associated with lane $L_1$ before deskew(A). To do so, for example, the slip detector 116 may access a FIFO buffer 104 relating to each lane $L_{1-N}$, which may be identified by a lane identifier in the FIFO buffer 104.

At 504, the apparatus 100 may access an FFL before deskew for a second lane. For example, the apparatus 100 may access FFL 2A associated with lane $L_2$ before deskew (A).

At 506, the apparatus 100 may determine a pre-deskew Δ FFL for the first lane and the second lane based on the FFL 1A and FFL 2A. For example, the pre-deskew Δ FFL may be determined by subtracting FFL2A from FFL1A.

At 508, the apparatus 100 may access an FFL after deskew for the first lane. For example, the apparatus 100 may access FFL 1B associated with lane $L_1$ after deskew(A).

At 510, the apparatus 100 may access an FFL after deskew for the second lane. For example, the apparatus 100 may access FFL 2B associated with lane $L_1$ after deskew(A).

At 512, the apparatus 100 may determine a post-deskew Δ FFL for the first lane and the second lane based on the FFL 1B and FFL 2B. For example, the pre-deskew Δ FFL may be determined by subtracting FFL2B from FFL1B.

At 514, the apparatus 100 may determine whether the pre-deskew Δ FFL (such as the pre-deskew Δ FFL determined at 506) matches the post-deskew Δ FFL (such as the post-deskew Δ FFL determined at 512). Lanes in which the pre-deskew Δ FFL matches the post-deskew Δ FFL will be referred to as "partner lanes." A "match" with respect to a Δ FFL may refer to an exact match such the Δ FFL of one lane is identical to the Δ FFL of another lane. In some examples, a "match" may refer to an approximate match with a tolerance value that permits a deviation from an exact match for purposes of identifying partner lanes. This tolerance value may be predefined and configured as needed. In these examples, a tolerance value of zero may equate to an exact match.

At 516, the apparatus 100 may add the second lane as a partner lane to the first lane responsive to a determination that the pre-deskew Δ FFL matches the post-deskew Δ FFL. Otherwise, the apparatus 100 may skip 516.

At 518, the apparatus 100 may repeat 502-516 for all lanes (where the first lane is compared to every other lane as described in 502-516) such that the number of partner lanes for each lane is determined.

At 520, the apparatus 100 may select the lane having the highest number of partner lanes as the reference lane. The reference lane may be considered the most stable lane because it has skewed the least among the lanes, as determined from the highest number of partner lanes. If there is a tie between two or more lanes, then the reference lane may be selected based on the lane identifier (for example, the lane with the lowest lane identifier (or other arbitrary lane for which there is a tie) may be selected as the reference lane).

Figure 6:
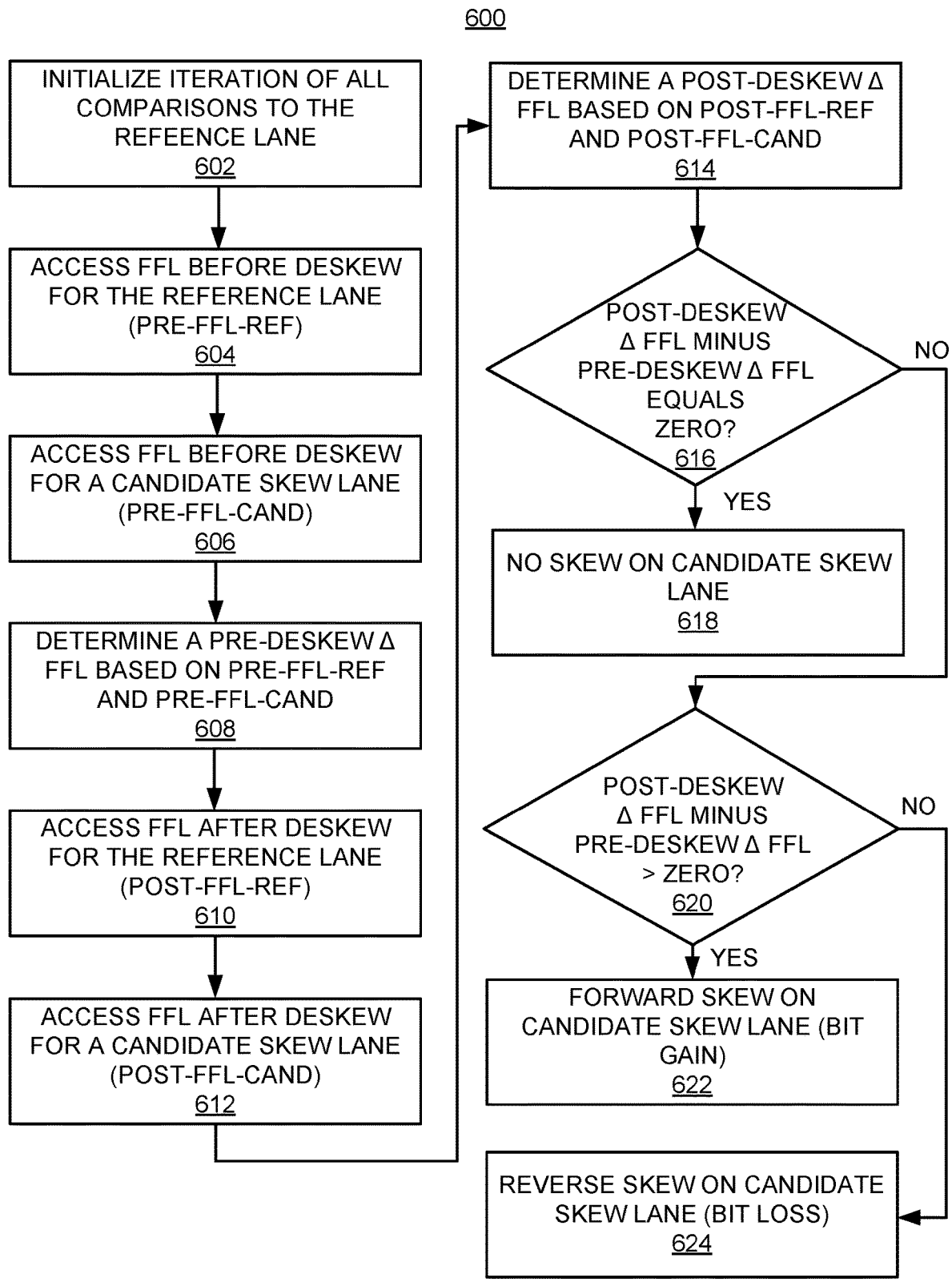
FIG. 6 illustrates an example method of slip detection, according to an example of the disclosure.

Reference will now be made with respect to FIG. 6, which illustrates an example method 600 of slip detection, according to an example of the disclosure. Although the method 600 is primarily described as being performed by apparatus 100 as shown in FIG. 1, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein. Various examples described in FIG. 6 will refer back to FIG. 4.

At 602, the apparatus 100 may initialize iteration of all lane comparisons to the reference lane identified by the method 500. In other words, the reference lane may be compared to lane, as described in blocks 604-624.

At 604, the apparatus 100 may access an FFL before deskew for the reference lane (the pre-FFL-ref).

At 606, the apparatus 100 may access an FFL before deskew for a candidate skew lane (the pre-FFL-cand). A candidate skew lane may be one of the plurality lanes in the datalink 102.

At 608, the apparatus 100 may determine a pre-deskew Δ FFL based on the pre-FFL-ref and the pre-FFL-cand. For example, the pre-deskew Δ FFL may be calculated as the pre-FFL-cand minus the pre-FFL-ref.

At 610, the apparatus 100 may access an FFL after deskew for the reference lane (the post-FFL-ref).

At 612, the apparatus 100 may access an FFL after deskew for the candidate skew lane (the post-FFL-cand).

At 614, the apparatus 100 may determine a post-deskew Δ FFL based on the post-FFL-ref and the post-FFL-cand. For example, the post-deskew Δ FFL may be calculated as the post-FFL-cand minus the post-FFL-ref.

At 616, the apparatus 100 may determine whether the post-deskew Δ FFL (determined at 614) minus the pre-deskew Δ FFL (determined at 608) is equal to zero. If the post-deskew Δ FFL minus the pre-deskew Δ FFL is equal to zero, at 618, the apparatus 100 may determine that there is no relative skew on the candidate lane.

On the other hand, at 620, if the post-deskew Δ FFL minus the pre-deskew Δ FFL is non-zero, the apparatus 100 may determine whether the post-deskew Δ FFL minus the pre-deskew Δ FFL is greater than zero. If the post-deskew Δ FFL minus the pre-deskew Δ FFL is greater than zero, at operation 622, the apparatus 100 may determine that there is forward skew on the candidate lane (such as a gain of bits—in other words, bit gain—has occurred).

If the post-deskew Δ FFL minus the pre-deskew Δ FFL is not greater than zero, at operation 624, the apparatus 100 may determine that there is reverse skew on the candidate lane (such bit loss has occurred). At either 622 or 624 the size of phase slippage (gain or loss) may be determined by the absolute value of the post-deskew Δ FFL minus the pre-deskew Δ FFL. As previously noted, each lane may be analyzed based on the method 600 such that a determination of phase slippage, direction, and/or size of such slippage may be detected for each lane in the datalink 102.

Figure 7:
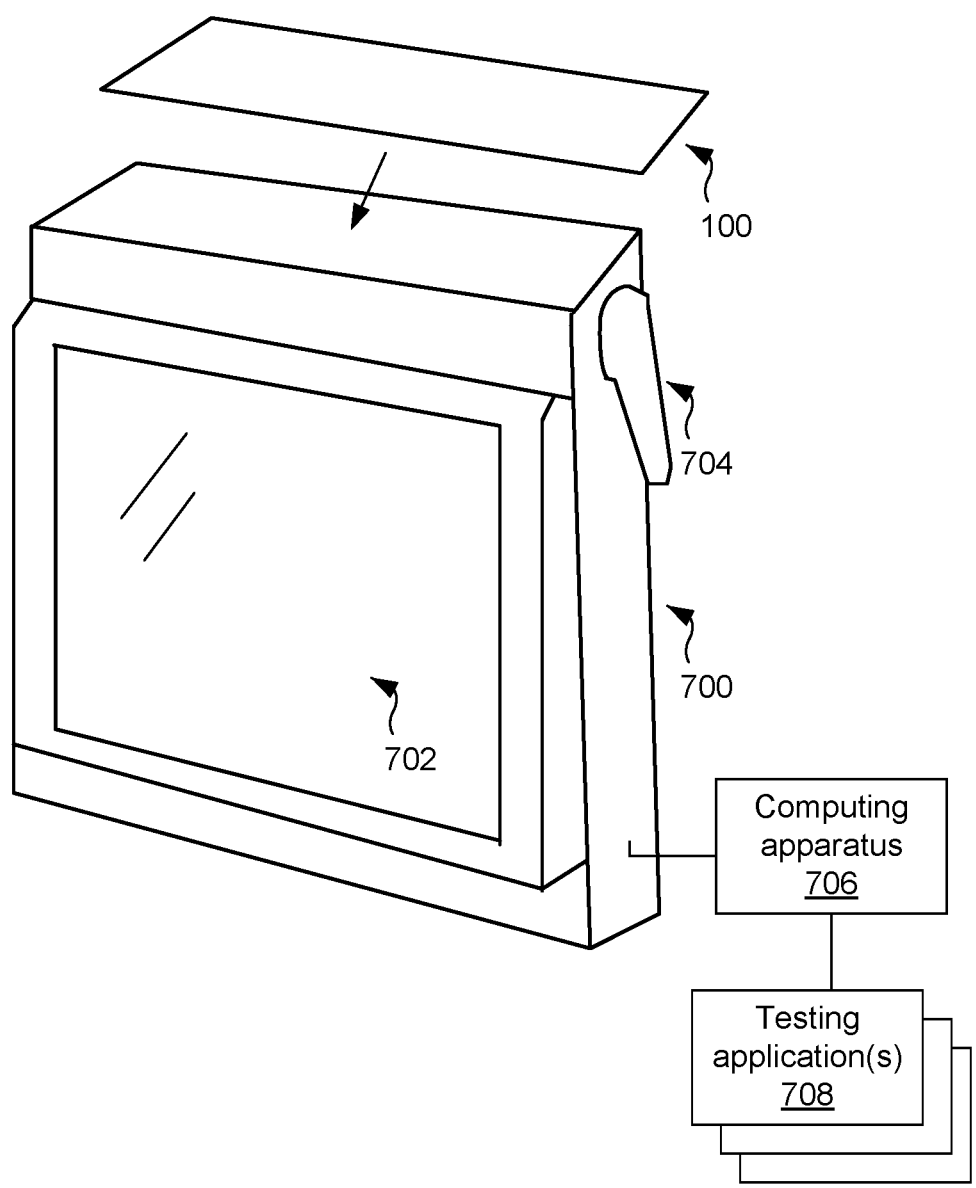
FIG. 7 illustrates a testing system with which an apparatus may be combined, according to an example of the disclosure.

FIG. 7 illustrates a testing system 700 with which an apparatus 100 may be combined, according to an example of the disclosure. For example, portions or all of the apparatus 100 may be removably or integrally combined. The particular manner of combination as illustrated is for illustration and not limitation. Other ways to combine the apparatus 100 with the testing system 700 may be used as well, including both wired and wireless combinations.

The testing system 700 may have a display 702, a handle 704, a computing apparatus 706, one or more testing applications 708, and/or other components. In examples that include the handle 704, the testing system 700 may be generally portable so that that the testing system 700 may be carried to different test locations. The display 702 may provide one or more graphical user interfaces (GUIs) generated by the apparatus 100 and/or other components of the testing system 700. The GUIs generated by the apparatus 100 may include indications of any of the determinations made by the apparatus. For example, the GUIs may display an indication of each lane's status depicting whether, by how much, and the direction of any phase slip. In some examples, the GUIs may be used to display recommended actions in response to detected phase slips, including any potential remedial responses.

The computing apparatus 706 may include a processor (not shown) similar to the controller 110, and data storage (not shown) similar to data storage 112. The computing apparatus 706 may store and execute one or more testing applications 708, which may be added and removed from the testing system 700. As such, the testing system 700 may provide a configurable testing platform for testing, datalinks such as the multi-lane serial datalink 102.

Examples are described above, and those skilled in the art will be able to make various modifications to the described examples without departing from the scope of the examples.

What is claimed is:

1. An apparatus to detect phase slips on a multi-lane serial datalink, the apparatus comprising:
   a multi-lane serial interface to couple to the multi-lane serial datalink comprising a plurality of lanes;
   a skew corrector to perform a deskew of each lane of the plurality of lanes; and
   a slip detector to:
      before completion of the deskew of each lane of the plurality of lanes, access a plurality of pre-deskew First-In-First-Out (FIFO) filling levels (FFLs), each pre-deskew FFL from among the plurality of pre-deskew FFLs corresponding to a FFL indicative of a rate of received bits on a respective lane from among the plurality of lanes before a deskew;
      after completion of the deskew of each lane of the plurality of lanes, access a plurality of post-deskew FFLs, each post-deskew FFL from among the plurality of post-deskew FFLs corresponding to a FFL indicative of a rate of received bits on a respective lane from among the plurality of lanes after the deskew; and
      after completion of the deskew of each lane of the plurality of lanes, detect whether or not there exists phase slippage of a lane in the multi-lane serial data link based on a comparison of the plurality of pre-deskew FFLs to the plurality of post-deskew FFLs, wherein to detect whether or not there exists phase slippage of the lane, the slip detector is further to:
         identify a reference lane from among the plurality of lanes based on the plurality of pre-deskew FFLs and the plurality of post-deskew FFLs, and
         for each lane of the plurality of lanes, detect whether or not there exists phase slippage of the lane with respect to the reference lane based on a FFL of the reference lane and a FFL of the lane.

2. The apparatus of claim 1, wherein to identify a reference lane from among the plurality of lanes, the slip detector is further to:
   identify, for each lane, a number of partner lanes of the lane; and
   select a lane having a highest number of partner lanes.

3. The apparatus of claim 2, wherein to identify the number of partner lanes, the slip detector is to:
   for each lane:
      (i) access a FFL of the lane before the deskew and a FFL of the lane after the deskew;
      (ii) access a FFL of a second lane before the deskew and a FFL of the second lane after the deskew;
      (iii) determine a first difference between the FFL of the lane before the deskew and the FFL of the second lane before the deskew;
      (iv) determine a second difference between the FFL of the lane after the deskew and the FFL of the second lane after the deskew;

(v) compare the first difference and the second difference; and
(vi) determine whether the second lane is a partner lane of the lane based on the comparison; and
repeat (i)—(vi) for other lanes of the plurality of lanes.

4. The apparatus of claim 1, wherein to detect whether or not there exists phase slippage of the lane with respect to the reference lane based on a FFL of the reference lane and a FFL of the lane, the slip detector is further to:
access a FFL of the reference lane before the deskew;
access a FFL of the lane before the deskew;
determine a pre-deskew difference between the FFL of the reference lane before the deskew and the FFL of the lane before the deskew;
access a FFL of the reference lane after the deskew;
access a FFL of the lane after the deskew;
determine a post-deskew difference between the FFL of the reference lane after the deskew and the FFL of the lane after the deskew; and
determine a difference between the pre-deskew difference and the post-deskew difference, wherein the difference between the pre-deskew difference and the post-deskew difference is used to determine whether or not the phase slippage of the lane exists.

5. The apparatus of claim 4, wherein the slip detector is further to:
determine that the difference is zero and that the phase slippage of the lane does not exist.

6. The apparatus of claim 4, wherein the slip detector is further to:
determine that the difference is non-zero and that the phase slippage of the lane exists.

7. The apparatus of claim 4, wherein the slip detector is further to:
quantify the phase slippage based on an absolute value of the difference.

8. The apparatus of claim 4, wherein the slip detector is further to:
determine a direction of the phase slippage based on a sign of the difference.

9. The apparatus of claim 8, wherein to determine the direction, the slip detector is further to:
determine that the sign is positive and that the direction is forward, indicating a gain of bits on the lane relative to the reference lane.

10. The apparatus of claim 8, wherein to determine the direction, the slip detector is further to:
determine that the sign is negative and that the direction is reverse, indicating a loss of bits on the lane relative to the reference lane.

11. An apparatus connectable to a multi-lane serial datalink, the apparatus comprising:
a multi-lane serial interface to couple to the multi-lane serial datalink;
a skew corrector to perform a deskew of each lane of a plurality of lanes of the multi-lane serial datalink; and
a slip detector to:
for each lane of the plurality of lanes:
access a pre-deskew First-In-First-Out filling level (FFL) of the lane before the deskew, the pre-deskew FFL indicative of a rate of received bits on the lane before the deskew;
access a post-deskew FFL of the lane after the deskew, the post-deskew FFL indicative of a rate of received bits on the lane after the deskew;
identify a reference lane based on the pre-deskew FFL of each of the plurality of lanes and the post-deskew FFL of each of the plurality of lanes, wherein to identify the reference lane, the slip detector is to (i) identify at least two lanes each having a same number of partner lanes, the same number of partner lanes being the highest number of partner lanes, and (ii) select an arbitrary one of the at least two lanes to serve as the reference lane; and
for each lane of the plurality of lanes:
determine a difference between a FFL of the reference lane and a FFL of the lane; and
detect phase slippage on the lane based on the determined difference.

12. The apparatus of claim 11, wherein the skew corrector is to detect a skew on a lane and initiate a deskew of the lane.

13. The apparatus of claim 11, wherein the skew corrector is to periodically perform the deskew of each lane and wherein the slip detector is to detect phase slips for each deskew.

14. The apparatus of claim 11, wherein each lane is identified by a lane identifier, and wherein the arbitrary selection is based on the lane identifier of the at least two lanes.

15. A method of detecting phase slips on a multi-lane serial datalink, the method comprising:
performing a plurality of periodic deskews of each lane of a plurality of lanes of the multi-lane serial datalink; and
for each periodic deskew of the plurality of periodic deskews:
for each lane of the plurality of lanes of the multi-lane serial datalink, accessing, by a slip detector, a First-In-First-Out filling level (FFL) of the lane, the FFL indicative of a rate of received bits on the lane;
identifying, by the slip detector, a reference lane from among the plurality of lanes based on the FFLs, wherein identifying the reference lane comprises:
for each lane:
(i) accessing a FFL of the lane before a deskew and a FFL of the lane after the deskew;
(ii) accessing a FFL of a second lane before the deskew and a FFL of the second lane after the deskew;
(iii) determining a first difference between the FFL of the lane before the deskew and the FFL of the second lane before the deskew;
(iv) determining a second difference between the FFL of the lane after the deskew and the FFL of the second lane after the deskew;
(v) comparing the first difference and the second difference; and
(vi) determining that the second lane is a partner lane of the lane based on the comparison;
repeating (i)—(vi) for other lanes of the plurality of lanes; and
selecting a lane having a highest number of partner lanes to serve as the reference lane;
for each lane of the plurality of lanes, detecting, by the slip detector, phase slippage of the lane with respect to the reference lane based on a FFL of the reference lane and a FFL of the lane; and
generating, by the slip detector, a display of whether or not any phase slippage was detected for the periodic deskew.

16. The method of claim 15, wherein detecting phase slippage of the lane with respect to the reference lane based on a FFL of the reference lane and a FFL of the lane comprises:

accessing a FFL of the reference lane before the deskew;
accessing a FFL of the lane before the deskew;
determining a pre-skew difference between the FFL of the reference lane before the deskew and the FFL of the lane before the deskew;
accessing a FFL of the reference lane after the deskew;
accessing a FFL of the lane after the deskew;
determining a post-skew difference between the FFL of the reference lane after the deskew and the FFL of the lane after the deskew;
determining a difference between the pre-skew difference and the post-skew difference; and
determining that the pre-skew difference and the post-skew difference does not match.

17. The method of claim 16, further comprising:
quantifying the phase slippage based on a difference between the pre-skew difference and the post-skew difference.

* * * * *